Oct. 29, 1946.　　G. O. DEUBNER　　2,410,273
POWER DRIVEN ROTARY GARDEN CULTIVATOR
Filed May 22, 1944　　2 Sheets-Sheet 1
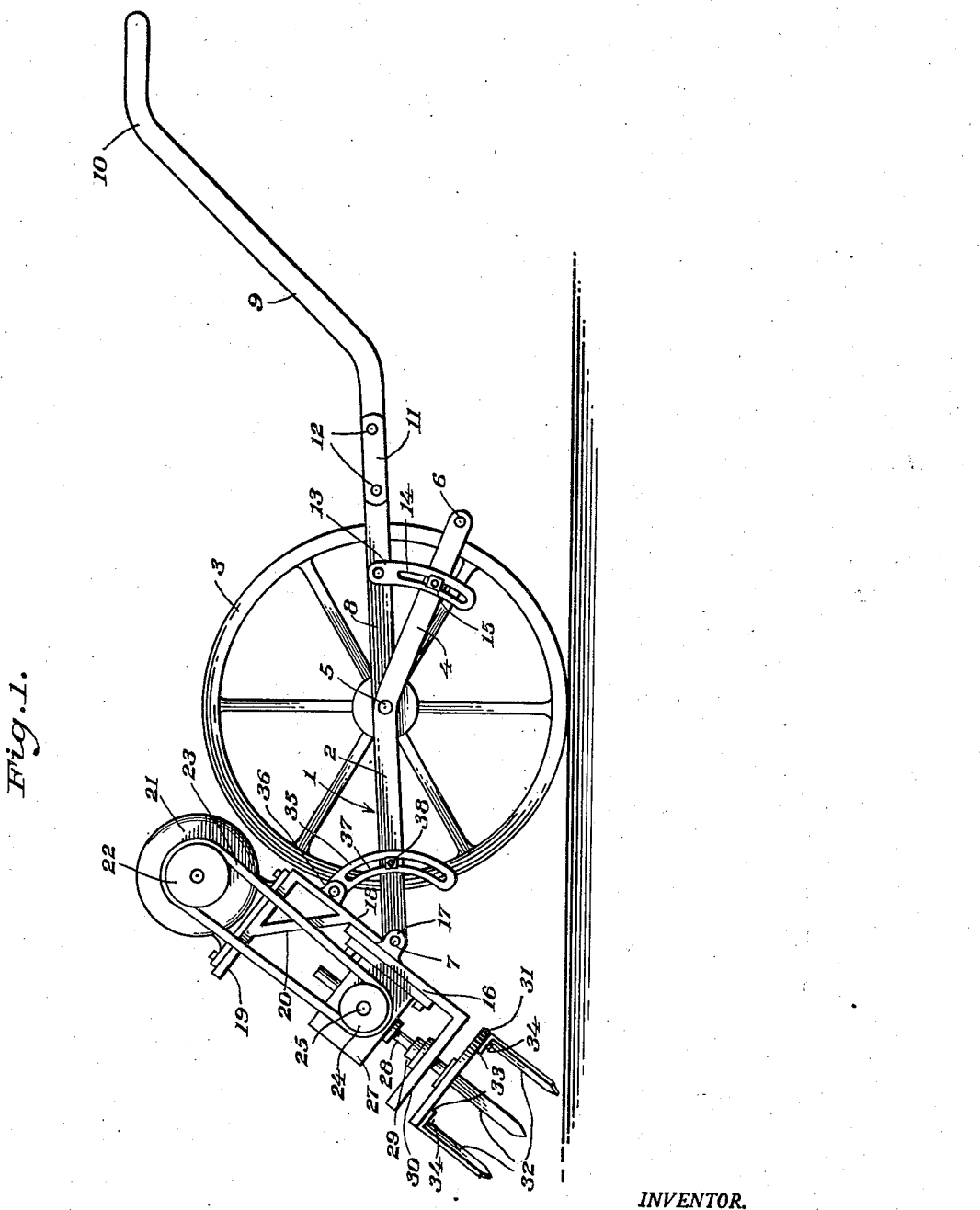
INVENTOR.
George O. Deubner:
BY
Victor J. Evans & Co.
ATTORNEYS

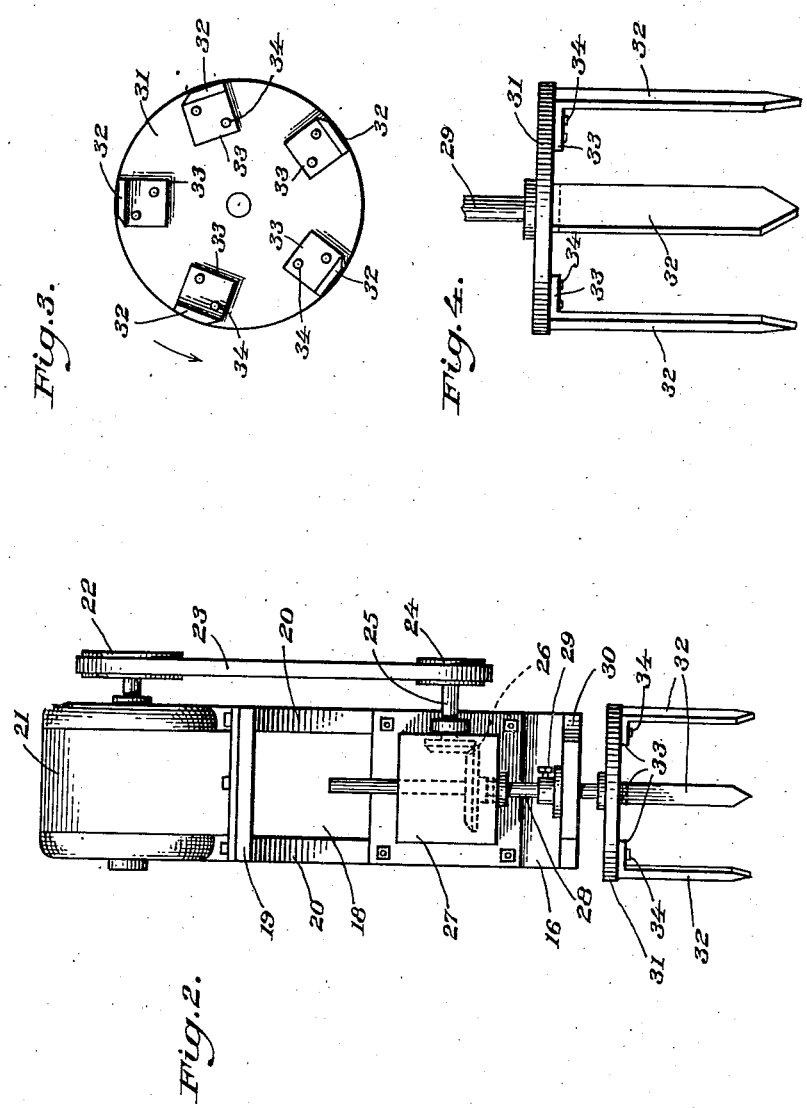

Patented Oct. 29, 1946

2,410,273

UNITED STATES PATENT OFFICE 2,410,273

POWER-DRIVEN ROTARY GARDEN CULTIVATOR

George Otto Deubner, Lafayette, Calif.

Application May 22, 1944, Serial No. 536,775

2 Claims. (Cl. 97—43)

This invention relates to garden implements and more particularly to a cultivator which is hand operated and particularly adapted for use in cultivating home gardens.

One object of the invention is to provide a cultivator which is of the wheeled, hand operated type, and of such construction that ground in close corners and around growing plants may be cultivated as well as ground which is more readily accessible.

Another object of the invention is to so arrange the blade carrier and driving mechanism for the same that the operator may stand back of the cultivator and manipulate the same in such manner that the blades move in a substantially vertical arcuate path, the cultivator being then shifted rearwardly and again swung for operation of the blades in an arcuate path. It will thus be seen that the operator is always back of the cultivator and standing upon ground which has not been cultivated and does not tramp down cultivated ground by walking on it.

Another object of the invention is to so arrange the frame carrying the blade carrier and a motor for driving the same that weight of the same will tend to sink the blades into the ground and allow the soil to be deeply cultivated without excessive effort by the operator.

Another object of the invention is to provide a cultivator wherein the blades are carried by a rotary disk and so arranged that rear edges of the blades do not drag while the blades are moving in a circular path.

Another object of the invention is to provide a cultivator of such construction that its handle may be vertically adjusted and the auxiliary frame or carrier for the digging mechanism and the motor tilted vertically to a set position in which the blades will most effectively enter the ground.

The invention is illustrated in the accompanying drawings wherein:

Figure 1 is a side elevation of the improved cultivator.

Figure 2 is a view looking at the front of the auxiliary frame and the cutting mechanism carried thereby.

Figure 3 is a view looking at the bottom of the blade carrier and blades carried thereby.

Figure 4 is a view in elevation of the blade carrier and its blades.

This improved garden cultivator has a main frame 1 having side bars 2 between which a wheel 3 is rotatably mounted. The rear portions 4 of the side bars 2 extend rearwardly from the axle 5 of the wheel at a downward incline with their rear ends projecting from the wheel and connected by a cross pin 6. Forward ends of the side bars carry a cross pin 7. It will thus be seen that the wheel is rotatably mounted in an open main frame having its front and rear ends spaced upwardly from the ground upon which the wheel rests. Bars 8 extend longitudinally of the main frame over the rear portion 4 of the side bars and have their front ends pivoted about the axle 5 for vertical swinging adjustment. These bars 8 project rearwardly of the wheel and at their rear ends are connected with side bars 9 of a handle 10 by plates 11 which are secured by removable fasteners 12. It will thus be seen that the handle may be shifted vertically to adjusted positions where it is held by arcuate members 13 pivoted to the bars 8 and formed with slots 14 through which pass bolts 15 passed transversely through the rear portion 4 of the side bars 2.

In order to carry the cultivating mechanism there has been provided an auxiliary frame 16 having depending ears 17 at opposite sides for receiving the cross pin 7 and tiltably mounting the auxiliary frame. The rear portion 18 of the auxiliary frame is in the form of a bracket having a forwardly projecting panel 19 at its upper rear end which is braced by braces 20 and carries a motor 21 which may be electric, as shown, or a gasoline driven engine. The shaft of the motor carries a pulley 22 about which is trained a belt 23 which extends forwardly therefrom and is engaged about the pulley 24 carried by the shaft 25 of speed reduction gearing 26. The speed reduction gearing is of conventional construction and enclosed in a casing 27 which is bolted to the auxiliary frame. The shaft 28 of the speed reduction gearing extends forwardly through a bearing 29 carried by the panel 30 and at its front end is secured to a circular disk which is formed of strong metal and constitutes a carrier for blades 32. The blades are formed of strong spring steel and have their upper ends bent to form side extensions or ears 33 through which fasteners 34 pass to hold the blades in place against the under face of the disk.

Referring to Figure 3 it will be seen that the blades are in off centered relation to the disk to such an extent that rear edges of the blades will not drag when the disk is rotating and the blades slicing through the ground, the points of the blades and front edges thereof being sharpened so that the blades will readily cut through the ground. Arcuate members 35 are pivoted at their upper ends to ears 36 at opposite sides of the bracket or rear section 18 of the auxiliary frame and formed with slots 37 to receive bolts 38 carried by the side bars 2 of the main frame. Therefore, the auxiliary frame may be tilted to an angularly adjusted position and secured in such angular relation to the ground that during operation of the cultivator the blades may readily slice their way through the ground. In view of the fact that the weight of the motor and the speed reduction gearing is over the disk and its blades, this weight will tend to urge the blades into the ground. Since a single wheel 3 is used the operator may swing the cultivator to move the set of blades in an arcuate path transversely of the cultivator and after covering a transverse swath, shift the cultivator rearwardly a short distance and reverse transverse movement. Therefore the blades travel back and forth and since the operator shifts the cultivator rearwardly and is standing upon ground which has not been cultivated he will not walk on the freshly cultivated ground and tread it down.

Having thus described the invention, what is claimed is:

1. A cultivator comprising a main frame, a wheel rotatably mounted in said frame intermediate its ends and having an axle carried by the frame, bars pivoted to the axle and extending rearwardly at opposite sides of the wheel, a handle carried by said bars and extending rearwardly therefrom, members pivoted to said bars and extending downwardly across the rear portion of the frame at opposite sides thereof and formed with arcuate slots, bolts carried by side portions of the frame and passing through the slots to hold the handle in a set position after vertical angular adjustment thereof, an auxiliary frame tiltably mounted on the forward end of said frame, a motor mounted on said auxiliary frame, and digging mechanism driven by said motor carried by said auxiliary frame at the lower end thereof for operating upon the ground in advance of the frame as the cultivator is intermittently moved rearwardly and swung up and down with the wheel serving as a fulcrum by an operator holding the handle.

2. A cultivator comprising a main frame, a wheel rotatably mounted in said frame intermediate its ends, a handle extending rearwardly from said frame, an auxiliary frame at the front of said main frame mounted for vertical tilting adjustment, members carried by said auxiliary frame and extending therefrom across opposite sides of the main frame, said members being formed with arcuate slots, bolts carried by the main frame and passing through the slots for securing the auxiliary frame in an angularly adjusted position, a motor mounted on said auxiliary frame, and digging mechanism driven by said motor and carried by the auxiliary frame on the lower end thereof for operating upon the ground as the cultivator is intermittently shifted rearwardly and then swung up and down with the wheel acting as a fulcrum.

GEORGE OTTO DEUBNER.